United States Patent [19]

Mooney

[11] Patent Number: 5,056,550

[45] Date of Patent: Oct. 15, 1991

[54] PILOT REGULATOR FOR VALVES

[76] Inventor: Richard J. Mooney, 2552 Neffs La., Salt Lake City, Utah 84109

[21] Appl. No.: 610,135

[22] Filed: Nov. 6, 1990

[51] Int. Cl.⁵ .............................................. G05D 16/06
[52] U.S. Cl. .................................... 137/270; 137/489; 137/488
[58] Field of Search ............... 137/270, 269, 489, 488

[56] References Cited

U.S. PATENT DOCUMENTS

| | | | |
|---|---|---|---|
| 3,561,468 | 2/1971 | Sugden | 137/270 X |
| 3,572,359 | 3/1971 | Weise | 137/270 U X |
| 3,878,859 | 4/1971 | Grob | 137/270 |

Primary Examiner—Alan Cohan
Attorney, Agent, or Firm—Robert R. Finch

[57] ABSTRACT

A pilot regulator has a main housing with a sensing chamber and a separate receiving chamber. The sensing chamber connects to the system for sensing. The receiving chamber is adapted to connect its inlet to the system upstream of the pilot and to the load line of the valve to be controlled and to connect its outlet downstream thereof, a cartridge containing a complete valve is removably received in the receiving chamber in position to control flow therethrough between the inlet and outlet. And a mechanism is disclosed for opening and closing the valve in response to sensing chamber pressure changes. The cartridge with its valve are removable as a unit for repair, mode change or replacement without disturbing connections to system.

7 Claims, 5 Drawing Sheets

PILOT REGULATOR FOR VALVES

FIELD OF INVENTION

This invention relates generally to a pilot regulator, commonly referred to as a pilot, used to regulate the main valves in a fluid-flow system. In particular the invention is directed to a pilot which may be configured to either the pressure reducing mode or pressure relief mode and which may be readily changed from one mode to the other simply by replacing a cartridge accessible from outside without removing the pilot from service or effecting major disassembly thereof.

PRIOR ART

Pilots are used to actuate (operate) the primary or main flow control valve in response to a selected change of pressure in the system wherein the valve operates. For instance, in the pressure reducing mode, the pilot senses a pressure reduction downstream of the valve, as would occur if a faucet is opened, and responds by effecting opening of the main valve to enable flow. In back pressure or relief use, the pilot is connected to sense pressure upstream of the valve. When the sensed pressure exceeds a predetermined level, the pilot responds by directing the main valve to open whereby to reduce the upstream pressure.

In both modes, one side (the inlet) of the pilot is connected upstream of the main valve to provide a source of fluid for pilot operation and for loading the main valve, suitable restrictors being provided in the supply line in accordance with usual practice. In both modes, the outlet from the pilot connects to the downstream side of the main valve, however, in the pressure reducing mode, the sensing connection of the pilot is downstream of the main valve while in the pressure relief mode, it is upstream thereof.

Prior pilot designs suffer from a common disadvantage that the internal valve mechanisms by which the pilot's mode is selected can only be accessed for change by complete disassembly of the pilot and reassembly in an alternate configuration. This requires that the pilot be completely removed from service, taken apart, necessary changes made, the pilot reassembled and thereafter returned to service with different connections to system. This is awkward, takes considerable time, and often requires an inventory of extra parts and/or complete spare pilots.

SUMMARY OF THE INVENTION

It is the primary object of the present invention to provide a pilot regulator, hereinafter called pilot, adapted to use in either a back pressure relief or pressure reducing system and convertible between such uses by the simple expedient of reversing parts accessible from the outside of the pilot without disassembly of the pilot body.

A further object is provision of a pilot adapted, while installed, to be converted from pressure reducing use to a back pressure or relief use by changing only its sensing line connection to the system while leaving undisturbed its connections to the main valve.

A related object is provision of a pilot achieving the foregoing objects which is so constructed that conversion from the pressure reducing mode to pressure relief mode may be readily effected with simple hand tools with only a modest rearrangement of parts and without adding, substracting or modifying any parts.

An important further object is provision of a pilot as described in which all important internal parts may be serviced and/or replaced without disassembly of the basic pilot housing. This is important, because internal valve mechanisms must be kept in peak condition to insure the reliability required of pilots.

In its most basic embodiment the pilot of the invention comprises a housing which includes a pressure sensing chamber and a separate receiving chamber in which is received a cartridge containing an internal pilot regulator valve that opens and closes in response to signals received from the pressure sensing chamber thereby to actuate flow through the main or controlled valve of a flow system. In accordance with this invention, the internal valve is entirely contained in a cartridge that is readily inserted into or removed from the receiving chamber without making or breaking any connections to the flow system. More specific embodiments of the invention will be apparent from this specification.

BRIEF DESCRIPTION OF INVENTION

In accordance with the invention, the foregoing and probably other objects are achieved by a pilot in which the internal valving necessary to achieve the selected operational mode, i.e. pressure reducing or pressure relief, comprises an assembly fully contained in a cartridge made to be inserted into and removed from a relatively small receiving chamber in the pilot housing. The receiving chamber has an primary inlet adapted to be connected to the fluid system on the upstream side of the main valve, and a primary outlet adapted to be connected to the fluid system on the downstream side of the main valve. The cartridge has an inlet and an outlet spaced therefrom (herein often referred as the secondary inlet and secondary outlet) which are so located that when the cartridge is in the receiving chamber its secondary inlet is able to communicate with the primary inlet of the receiving chamber and its secondary outlet with the primary outlet of the receiving chamber. Inside the cartridge, an internal valve is located between the secondary inlet and secondary outlet. In the illustrated embodiment, the valve includes an orifice, a plug, and springs so the plug may open and close flow from said inlets through said orifice to outlet. The receiving chamber is so formed that when the cartridge is in place, it and the wall of the receiving chamber co-operate to define two separate subchambers one of which connects through the primary inlet to the system upstream of the controlled valve while the other connects downstream thereof and the internal valve in the cartridge controls flow between said subchambers. The pilot includes the usual spring-loaded diaphragm and associated connection for sensing and responding to pressure changes.

The assembled cartridge includes flow control means adapted to be operated from outside the cartridge for opening and closing the internal valve. Such flow control means are actuated in response to pressure changes in the controlled system. In the illustrated embodiment, the flow control means comprise the orifice and plug together with a shaft mounting the plug for guidance into and out of the orifice. The shaft is resiliently mounted, either by the internal spring in the cartridge or by the spring acting on the diaphragm, so the plug is normally urged into the orifice to close the valve. A free end of the shaft extends from the cartridge into the separate sensing chamber where it can be directly acted upon, one way or the other, by the diaphragm as the latter deflects under the influence of system pressure or changes therein.

When the internal valve of the cartridge opens, the resulting flow through the cartridge and from the pilot results in pressure changes which in turn affect loading on the controlled main valve with resultant changes in flow.

In the illustrated preferred embodiment, when the pilot is configured in the pressure reducing mode, downstream demand causes (allows) the diaphragm to be deflected toward the cartridge thus acting on the shaft to push the plug out of the orifice thereby to initiate flow through the cartridge from the inlet subchamber to the outlet subchamber thus unloading the main valve so it will open to allow flow therethrough.

When the cartridge is configured in the pressure relief mode the plug is positioned so that the diaphragm retainer holds the plug in the orifice closing the same. Increased upstream pressure stream forces the diaphragm away from the cartridge thus easing pressure on the valve plug whereupon the orifice is unplugged to permit flow therethrough thus to unload the controlled main valve and initiate flow therethrough.

As usual, the sensing function of the pilot is accomplished by connecting the sensing chamber to the appropriate side of the main valve. That is, upstream for pressure relief or downstream for pressure reducing. At the same time, the main valve loading line connects from the upstream conduit, at a location following the restrictor, to the main valve actuator or control device.

In order that the invention may be more readily understood and carried into effect, reference is made to the accompanying drawings and the description thereof which are offered by way of illustration only and not in limitation of the invention the scope of which is defined only by the appended claims and equivalents embraced therein rather than any mere description.

DESCRIPTION OF PREFERRED EMBODIMENT

Figure 1:
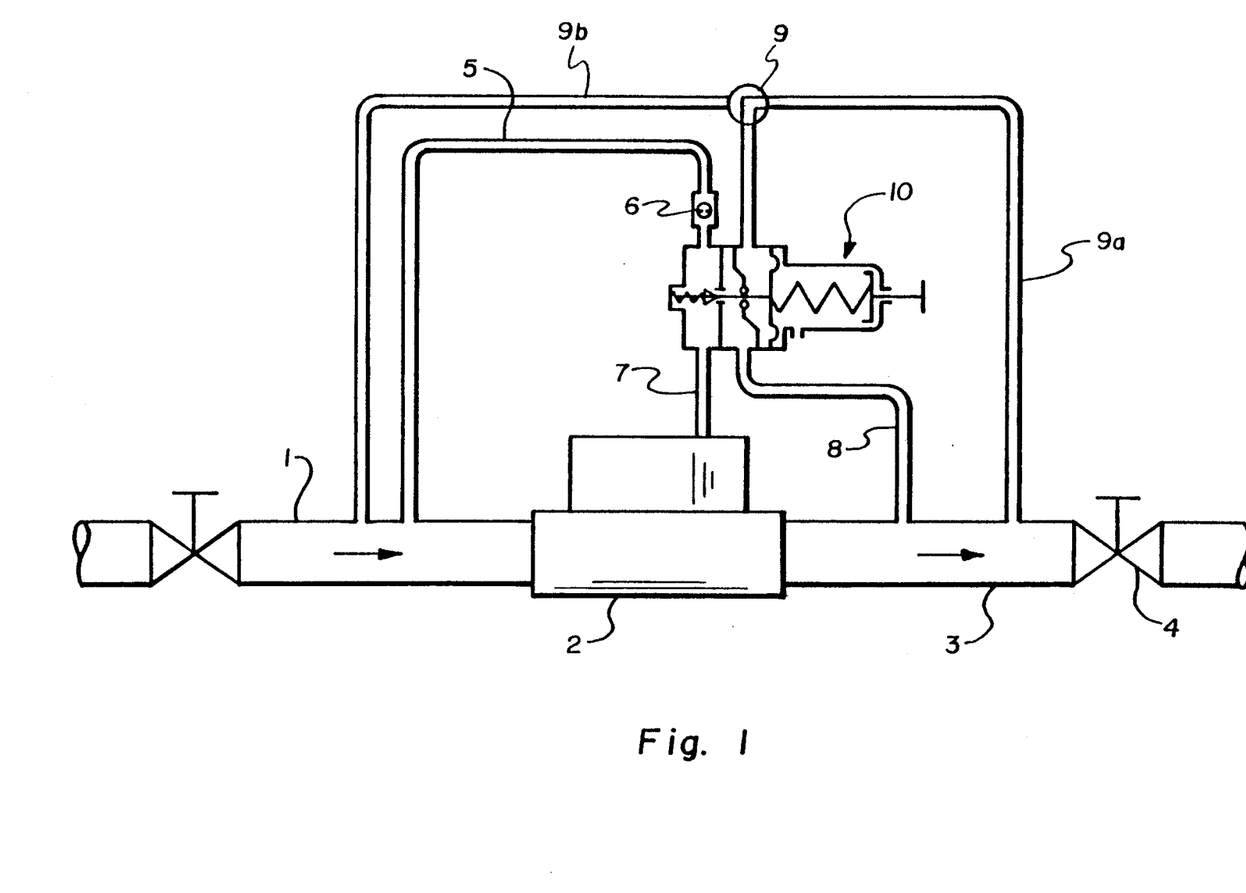
FIG. 1 is a simplified diagram of a system embodying the invention.
Figure 2:
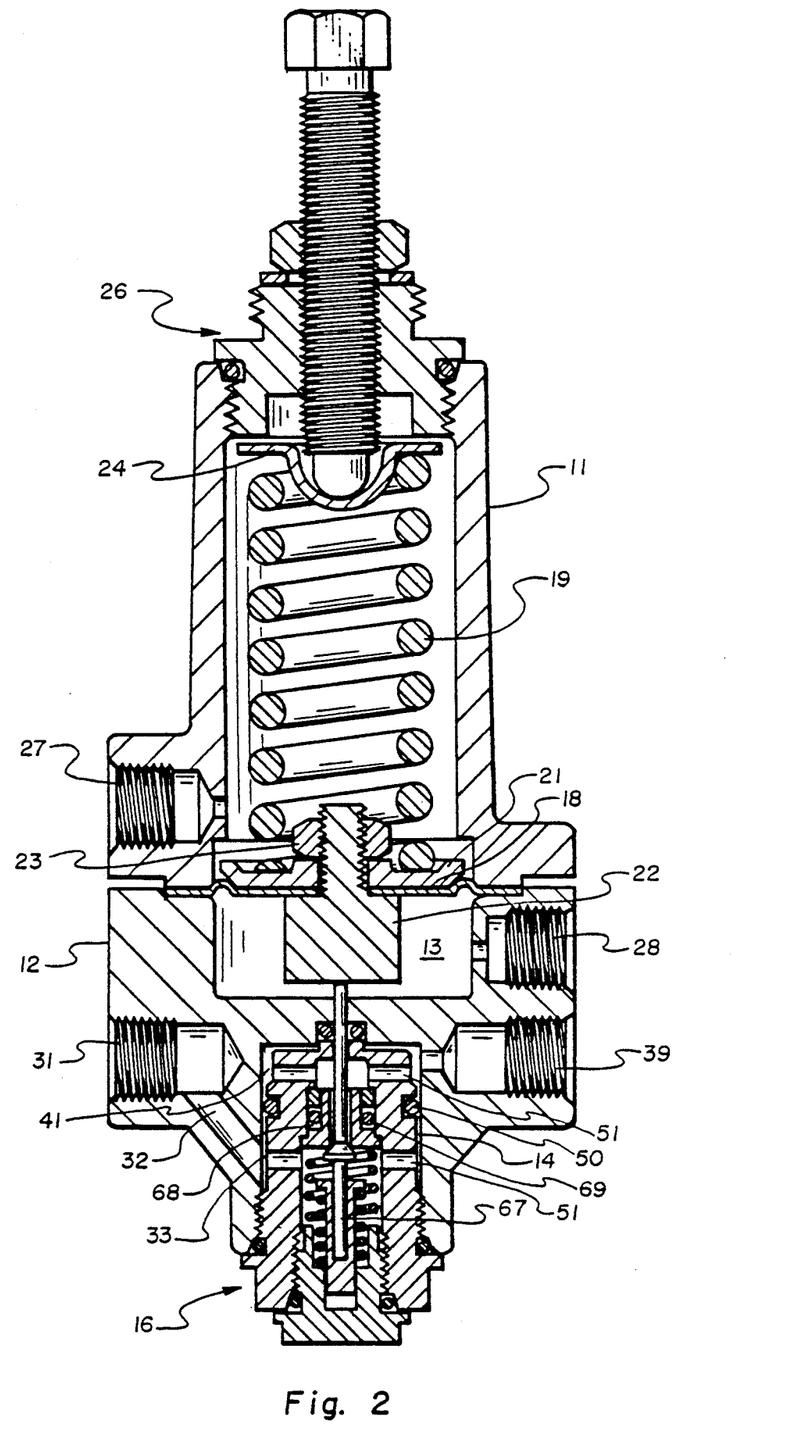
FIG. 2 is a side sectional view of the pilot of the invention.
Figure 3:
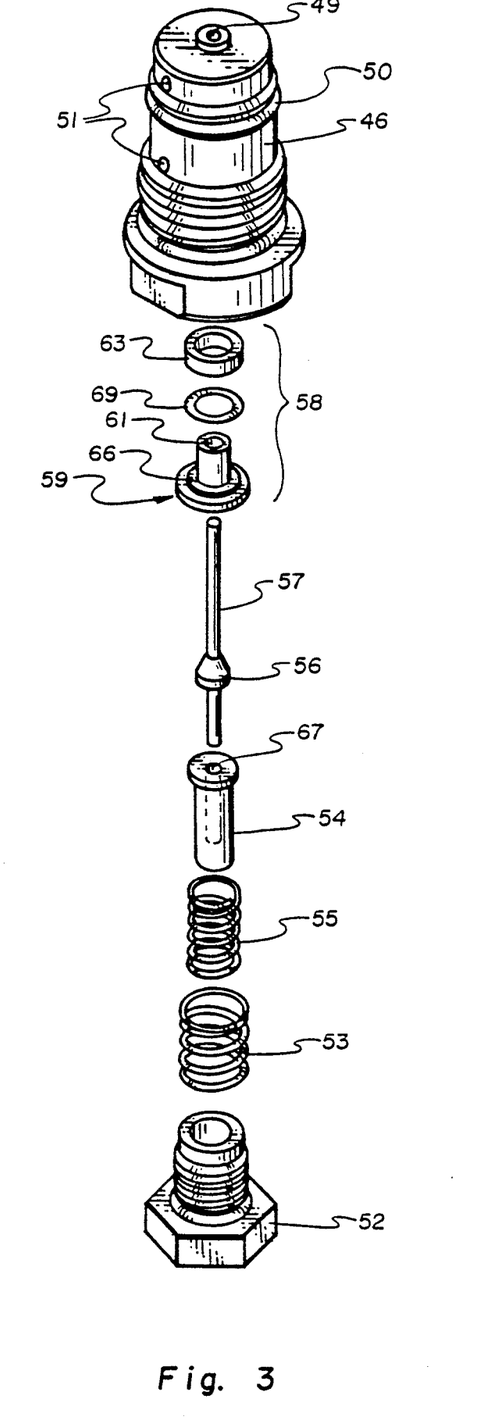
FIG. 3 is an exploded view of the cartridge assembly of the pilot, the parts being arranged to configure the pilot in the pressure reducing mode.

Referring first to FIGS. 1-3, the pilot 10 comprises a spring housing 11, suitably secured by bolts not shown, to a main body 12 which has formed in the top a cylindrical sensing chamber 13 and in the bottom a cylindrical receiving chamber 14 in which is received a cartridge 16.

The sensing chamber is covered by a diaphragm 18 clamped between the spring housing and body. A suitable main compression spring 19 extends upwardly from a plate 21 that lies atop the diaphragm and is secured thereto y a retainer 22 and nut 23. The main spring is held in place by a spring retainer 24 and closing cap with adjusting screw assembly 26. A usual side wall vent 27 is provided in the spring housing.

An outlet 28 from the sensing chamber connects between the chamber and the system conduit to be sensed. As illustrated in FIG. 1 the connection is via a three way valve 9 and either conduit 9a to the downstream side of the main valve or conduit 9b to the upstream side thereof. An outlet 39 from the receiving chamber 14 also connects to the downstream side of the main valve. It will be noticed that the chamber 14 is divided into two sub-zones 33 and 41 which are defined between the cartridge wall and receiving chamber wall on opposite sides of a suitable O ring 50 which seals the space between the walls.

The inlet 31 connects to the upstream side of the main valve and also provides loading pressure to the actuator for the main (controlled) valve. Note that the pilot inlet and main valve loading both connect to upstream system pressure at a location between the usual restrictor and the pilot. As noted the outlet 39 provides communication between the upper (outlet) zone of the chamber and the downstream side of the main valve. So, when the internal valve of the pilot is open, fluid flows from the chamber (and the pilot) faster than it can flow through the upstream restrictor. This reduces pressure in the inlet and loading connections thereby opening the controlled main valve.

Basic to this invention is the construction and function of the removable cartridge 16 and, of course, its critical relationship to the pilot housing. The cartridge has alternate formats which determine the pilot configuration or mode. The pressure reducing configuration is illustrated in FIGS. 2 and 3 which will be described first.

The cartridge comprises an elongated cylindrical piece 46 that is open at one end but closed at the other end except for a small central hole 49. The cartridge has spaced apart inlet and outlet holes 51 through the side wall of the main cylindrical piece 46. A cap 52 closes the open end of the cartridge. Contained within the cartridge are several axially aligned components. Such components, as illustrated in FIGS. 2-3, include an orifice spring 53, which is concentric about a stem guide 54 and a return spring 54. The orifice spring 55 keeps the orifice assembly in place and also provides back-up protection to the internal valve plug against excessive force that may be present in the pressure relief mode; a frusto conical plug 56 on a stem 57; and an orifice assembly 58. The stem 57 is received and bottoms in a central bore 67 of the stem guide.

The orifice assembly comprises a central piece 59 with a bottom flange and upstanding cylindrical section 66 with a central passage 61 through which the stem passes. The edges at both ends of the passage 61 are chamfered to provide good contact with the plug surface. A close fitting washer 63 fits concentrically over the cylindrical piece 66 and forms therewith a virtual annular groove 68 in which is received a suitable "O" ring 69.

Although the groove 68 appears as a groove, in actual practice it does not behave in all respects like one. This is because the movable washer 63 acts to reduce the pressure exerted against the plug in the pressure relief mode with the result that the annular area of the movable washer does not exert pressure against the orifice assembly.

The orifice assembly will protect the plug from excessive force in those situations in the pressure relief mode when the sensed pressure gets unusually low compared to the pressure "set point" established by compression of the main spring. This is because the orifice spring 55 will take over to allow some further movement of the central piece 59 under urging of the plug even though the return spring 53 has reached the limit of its travel.

Suitable grooves and O rings are also provided to seal the cartridge in the receiving chamber and to seal the cap.

When assembled as in FIG. 2, the unit is configured in the pressure reducing mode in which it will respond to downstream pressure reduction. Pressure loss sensed in the sensing chamber lets the spring move the diaphram retainer against the stem to push the plug out of the orifice whereupon fluid flows from the pilot at a higher rate than replacement fluid flows through the restrictor. This will reduce loading pressure on the main valve actuator to open the valve in usual manner.

Figure 4:
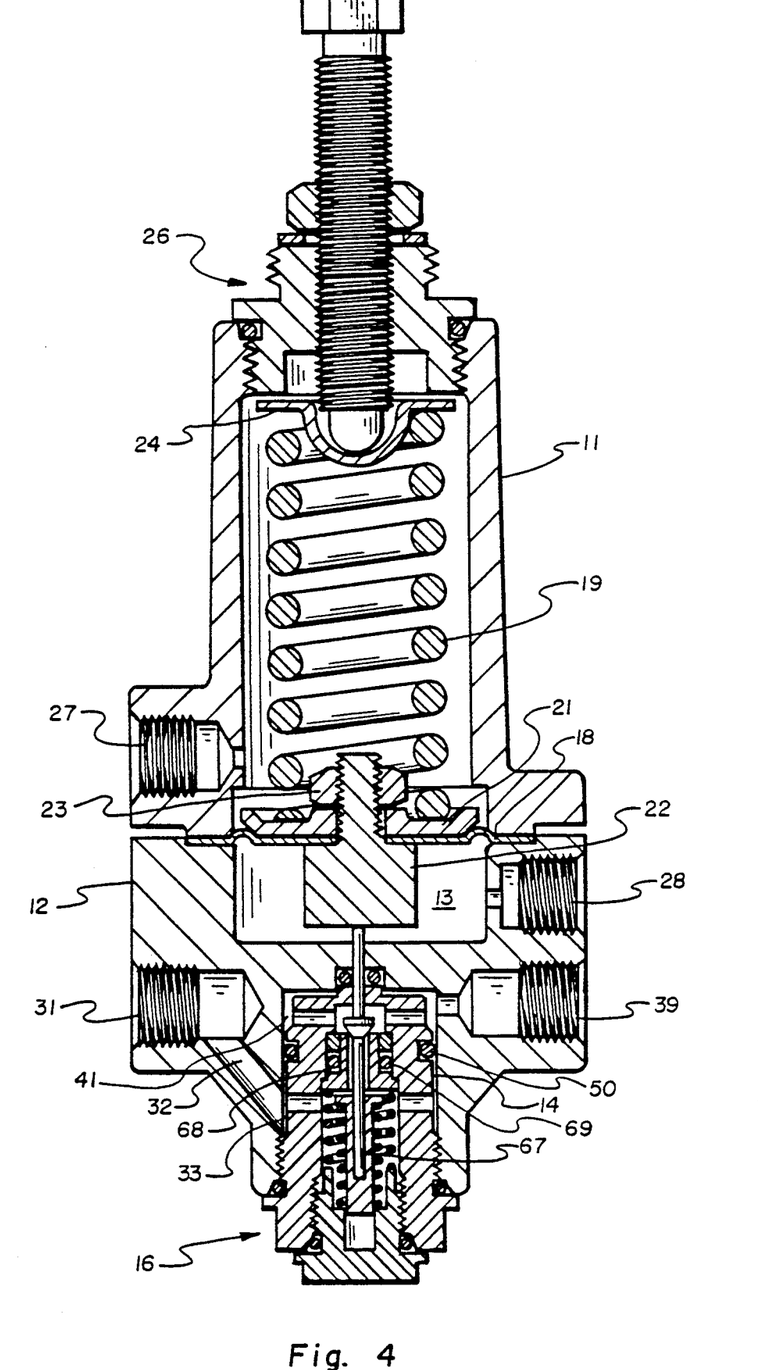
FIG. 4 is a side sectional view of the pilot, similar to FIG 2, but with the pilot assembled in the pressure relief mode.
Figure 5:
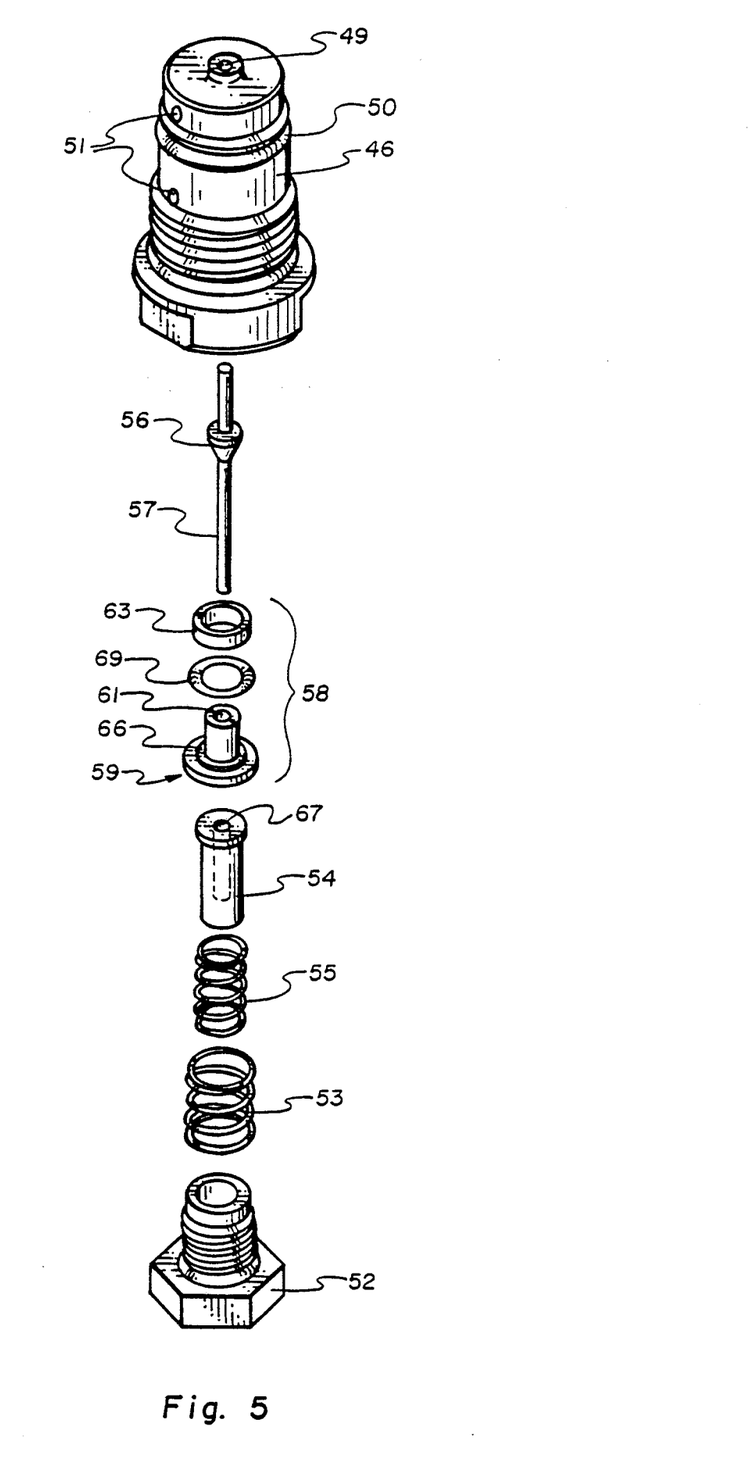
FIG. 5 is an exploded view similar to FIG. 3, but of a cartridge configured in the pressure relief mode.

When the pilot is configured for the pressure relief mode, as will be the case when the cartridge is assembled as shown in FIGS. 4 and 5, the stem and plug are reversed and are inserted in the bore first followed by the orifice assembly, All other parts are assembled as previously described. The assembled pilot is illustrated in FIG. 4.

In FIG. 4, the stem 57 rests directly against the diaphragm retainer so the diaphragm spring pressure will normally hold the plug in the orifice to block flow. The sensing chamber is suitably connected upstream of the main valve. When main line pressure exceeds the preset level, the resulting pressure increase in the sensing chamber causes the retainer to move away from the stem thus allowing the plug to uncover the orifice to permit flow therethrough in turn reducing loading pressure and opening the main valve.

In both modes, the diaphragm cooperates with the stem to open the orifice. The stem lengths on the opposite ends of the plug differ to accommodate the different positions of the plug relative to the orifice assembly in the alternate modes. In both modes, one end of the stem is received and bottomed in the central bore 67 in the stem guide 54. This aligns the plug and sets its proper spacing. The return spring 53 urges the guide and plug into position. The free end of the stem extends through the hole in the top of the receiving chamber to terminate at its engagement with the diaphragm retainer in the sensing chamber.

From the foregoing it is clear that the essence of the invention resides in provision, in a pilot, of an internal valve mechanism that is contained in a readily removable cartridge which is in turn easily removed from the pilot housing for modification to change the pilot configuration. In both configurations the valve is controlled by the diaphragm and main spring which are in turn regulated by response to a sensed pressure in usual manner.

No doubt, the basic concept of a cartridge-contained valve mechanism may be employed for a variety of uses. Certainly, the specific embodiment of a cartridge-contained pilot valve mechanism will find wide use in pilot-regulated systems. It enables rapid on-site trouble shooting; replacement parts may be installed quickly; and change of selected configuration or mode may be done quickly.

Although the preferred embodiment has been described in connection with a pilot having a particular arrangement of connections it will be apparent that variant arrangements may be made so long as the connections are convenient and provide for the sensing, necessary restrictions, loading and outlets. If desired, the main valve loading and pilot inlet lines could be through the same connection so long as it is downstream of the restrictor. Similarly, the sensing chamber is described as connecting downstream or upstream from the main valve. Actually the sensing could occur right at the main valve outlet or inlet. What is important is that the sensing chamber communicate with the main line either downstream or upstream of the main (controlled) valve as dictated by the pilot configuration.

Also, even though in the preferred embodiment described above, the basic invention of a readily replaceable encapsulated valve is shown in a structure wherein the internal valve is operated by engagement of the main diaphragm retainer with an end of the plug-carrying shaft, it is within the scope of the invention to effect such operation by means other than the main diaphragm. For instance, a push button, solenoid or the like could be used to engage the shaft, either in lieu of or complemental to the main diaphragm.

With the present invention, once the cartridge has been reassembled, the mode change is completed by changing only the sensing connection. Nothing more is required for pilot configuration.

Having thus described my invention that which I desire to secure by Letters Patent is set forth in the following claims.

I claim:

1. A pilot regulator for operating the control device of a main valve adapted to use in a fluid-flow system wherein the upstream side including control device of said main valve connects to an inlet conduit providing a source of pressured fluid and the downstream side of said main valve connects to a discharge conduit; said pilot regulator comprises; a body having defined therein a sensing chamber and a receiving chamber, said sensing chamber being defined on one side by a common wall with said receiving chamber and on an opposite side by a flexible diaphragm; a compression spring urging said flexible diaphragm toward said sensing chamber; a housing secured to said body enclosing both said flexible diaphragm and said compression spring; means enabling connection of said sensing chamber to the conduit either upstream or downstream of said main valve as selected; a primary inlet in said receiving chamber adapted to be connected to communicate with said upstream side of said main valve, a primary outlet in said receiving chamber spaced from said primary inlet and adapted to be connected to communicate with said downstream side of said main valve, a subsidiary valve and subsidiary valve control means removably received in said receiving chamber between said primary inlet and said primary outlet whereby to control flow therebetween, said subsidiary valve control means being responsive to deflection of said flexible diaphragm in said sensing chamber to regulate flow through said receiving chamber, said subsidiary valve and subsidiary valve control means being combined as a component adapted to be installed in and/or removed from said receiving chamber as a unit while said housing enclosing said compression spring and flexible diaphragm is secured to said body.

2. A pilot regulator for operating the control device of a main valve adapted to use in a fluid-flow system wherein the upstream side including control device of said main valve connects to an inlet conduit providing a source of pressured fluid and the downstream side of said main valve connects to a discharge conduit; said pilot regulator comprises; a body having defined therein a sensing chamber and a receiving chamber, said sensing chamber being defined on one side by a common wall with said receiving chamber and on an opposite side by a flexible diaphragm; a compression spring urging said flexible diaphragm toward said sensing chamber; a housing secured to said body enclosing both said flexible diaphragm and said compression spring; means enabling connection of said sensing chamber to the conduit either upstream or downstream of said main valve as selected; a primary inlet in said receiving chamber adapted to be connected to communicate with said upstream side of said main valve, a primary outlet in said receiving chamber spaced from said primary inlet and adapted to be connected to communicate with said downstream side of said main valve, a subsidiary valve and subsidiary valve control means removably received in said receiving chamber between said primary inlet and said primary outlet whereby to control flow therebetween, said subsidiary valve control means being responsive to deflection of said flexible diaphragm in said sensing chamber to regulate flow through said receiving chamber, said subsidiary valve and subsidiary valve control means being combined as a component adapted to be installed in and/or removed from said receiving chamber as a unit while said housing enclosing said compression spring and flexible diaphragm is secured to said body; and said subsidiary valve and subsidiary valve control means being characterized in that said subsidiary valve comprises a cartridge with a hollow interior, a secondary inlet adjacent one end of said hollow interior and a secondary outlet adjacent the opposite end thereof, a block in said hollow interior intermediate said secondary inlet and secondary outlet, an orifice in said block which when open provides communication between said secondary inlet and secondary outlet, a plug adapted to fit into said orifice to close the same, plug mounting means mounting said plug for guided movement into and out of said orifice, resilient means normally urging said plug in a direction toward said secondary outlet, said plug mounting means comprising an elongated shaft on which said plug is mounted intermediate the shaft ends, a central opening in the end of said cartridge nearest said secondary outlet through which one end of said shaft extends, said sensing chamber being located adjacent said receiving chamber at a common wall, an opening in said common wall, and said cartridge being located in said receiving chamber in position such that said one end of said shaft extending from said cartridge extends also through said opening in said common wall into said sensing chamber to terminate at contact with said diaphragm therein whereby deflection of said diaphragm effects withdrawal of said plug from said orifice.

3. A pilot regulator according to claim 2 with the addition of means cooperative between said receiving chamber and said cartridge and defining in said receiving chamber an inlet zone communicating solely with said primary and secondary inlets and an outlet zone communicating solely with said primary and secondary outlets.

4. A pilot regulator according to claim 2 in which said plug is located in said hollow interior on the side of the block nearest said secondary inlet, and said resilient means normally urging said plug toward said secondary outlet comprises a spring in said hollow interior on the same side of the block as said plug and mounted to continuously urge said plug toward and into said orifice.

5. A pilot regulator according to claim 2 in which a spring in said housing urges said diaphragm toward said sensing chamber, said plug is located in said hollow interior on the side of said block nearest said outlet, a second spring is located in said hollow interior urging said plug toward said outlet and away from said orifice, and the pressure of said diaphragm on the end of said shaft is sufficient to normally hold said plug in said orifice against the urging of said second spring.

6. A pilot regulator according to claim 2 in which said hollow interior and said block are both cylindrical, said block is concentric to and slideable within said hollow interior, an end portion of said block nearest said outlet being formed as a reduced diameter cylinder terminating at a shoulder, a washer slideably fitted on said reduced diameter cylinder thereby to form with said shoulder a groove adapted to receive an O ring.

7. A pilot regulator according to claim 2 or claim 5 in which said plug and shaft are adapted to be positioned in said hollow interior of said cartridge in either a first position in which said plug is on the side of said block nearest said secondary inlet or a second position in which said plug is on the side of said block nearest said secondary outlet, and said resilient means in said hollow interior normally urging said plug toward said secondary outlet is on the side of said block nearest said secondary inlet.

* * * * *

UNITED STATES PATENT AND TRADEMARK OFFICE
Certificate

Patent No. 5,056,550

Patented: October 15, 1991

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Richard J. Mooney, Salt Lake City, Ut and Dwight N. Johnson, San Diego, CA.

Signed and Sealed this Eighth Day of June, 1999.

DENISE FERENSIC
*Supervisory Patent Examiner*
Art Unit 3753